United States Patent
Burdgick et al.

(10) Patent No.: US 8,167,313 B2
(45) Date of Patent: May 1, 2012

(54) SEAL MEMBER, ASSEMBLY AND METHOD

(75) Inventors: Steven Sebastian Burdgick, Schenectady, NY (US); Andrew Greif, Geneva, IL (US)

(73) Assignee: General Electric Company, Schenectady, NY (US)

( * ) Notice: Subject to any disclaimer, the term of this patent is extended or adjusted under 35 U.S.C. 154(b) by 330 days.

(21) Appl. No.: 12/409,824

(22) Filed: Mar. 24, 2009

(65) Prior Publication Data

US 2010/0066024 A1  Mar. 18, 2010

Related U.S. Application Data

(63) Continuation-in-part of application No. 11/282,703, filed on Nov. 21, 2005, now abandoned.

(51) Int. Cl.
*F16J 15/447* (2006.01)
(52) U.S. Cl. .................................................. 277/355
(58) Field of Classification Search ............... 277/355
See application file for complete search history.

(56) References Cited

U.S. PATENT DOCUMENTS

| | | | |
|---|---|---|---|
| 5,971,400 A * | 10/1999 | Turnquist et al. | 277/416 |
| 6,105,967 A * | 8/2000 | Turnquist et al. | 277/355 |
| 6,131,910 A * | 10/2000 | Bagepalli et al. | 277/355 |
| 6,250,641 B1 * | 6/2001 | Dinc et al. | 277/355 |
| 6,571,470 B1 | 6/2003 | Mortzheim | |
| 6,685,427 B1 | 2/2004 | Dhar et al. | |
| 6,821,086 B1 | 11/2004 | Brisson et al. | |
| 6,840,519 B2 * | 1/2005 | Dinc et al. | 277/413 |
| 6,854,735 B2 * | 2/2005 | Sarshar et al. | 277/355 |
| 2007/0114727 A1 | 5/2007 | Greif et al. | |

FOREIGN PATENT DOCUMENTS

EP  1722135 A2  11/2006

OTHER PUBLICATIONS

EP 10156525.7, European Search Report and Written Opinion, Aug. 19, 2010.

* cited by examiner

*Primary Examiner* — Gilbert Lee
(74) *Attorney, Agent, or Firm* — Nixon & Vanderhye, P.C.

(57) ABSTRACT

A brush seal assembly and method for sealing a turbine machine rotary member relative to a stationary member circumscribing the rotary member. The seal assembly includes a first compliant seal component disposed at a radially inward region of the stationary member in rubbing contact with a surface of the rotary member. The seal assembly also includes at least one hard seal element formed integrally with a carrier of the first compliant seal component, located a specified axial distance from the first compliant seal component.

17 Claims, 2 Drawing Sheets

SEAL MEMBER, ASSEMBLY AND METHOD

This invention is a continuation-in-part of application Ser. No. 11/282,703 filed Nov. 21, 2005, the entirety of which is incorporated herein by reference.

BACKGROUND OF THE INVENTION

The present invention generally relates to dynamic seals of the type used in turbo machinery.

Labyrinth-type packings and brush seals are widely used in steam turbines and in aircraft and industrial gas turbines to provide dynamic seals between the rotating and static turbine components, such as the rotor and diaphragm inner web of a steam turbine. Traditional labyrinth packing comprises a series of (hard) teeth that project radially inward from the circumference of a static component and toward but out of contact with the rotary component, thereby defining a series of partial barriers that create a tortuous axial flow path immediately adjacent the surface of the rotary component.

Brush seals typically comprise metal bristles that, similar to the teeth of a labyrinth packing, project radially inward from the circumference of a static component toward a rotary component. In contrast to labyrinth packings, brush seals are normally intended to be in rubbing contact with the adjacent circumferential surface of the rotary component, creating a substantially continuous barrier to flow around the circumference of the rotary component. In this regard, brush seals provide a more effective barrier to secondary flow losses, i.e., provide better sealing performance, as compared to labyrinth packings, and therefore have the potential for significantly improving performance.

The rotors of aircraft and industrial gas turbines are relatively stiff, and as a result their dynamic behavior is not generally affected by rubbing contact with a brush seal. In contrast, the rotor of a steam turbine typically includes a continuous solid shaft to which buckets are attached. Impulse-type steam turbines typically operate above the rotor's first bending critical frequency, and often near the second bending critical frequency. It has been shown that the rubbing contact between a brush seal and the rotor of a steam turbine can magnify rotor vibration through the first and second critical speeds of a rotor, resulting in unacceptable radial rotor movement. It is believed that this effect is particularly likely to occur if the rotor is bowed as a result of thermal, dynamic or manufacturing circumstances. More particularly, the friction resulting from the rubbing contact locally increases the surface temperature of the rotor, leading to nonuniform surface temperatures along its circumference. Because high (proud) spots of a bowed rotor are particularly prone to heating in this manner from more intense rubbing contact, the localized heating caused by brush seals can further increase bowing in a rotor as a result of nonuniform thermal expansion about the rotor circumference, thereby exacerbating vibration and rotor dynamics concerns.

In commonly assigned U.S. Pat. No. 6,821,086, the disclosure of which is incorporated herein by this reference, a seal assembly and method therefor are disclosed that are capable of significantly reducing vibration and rotor dynamics concerns that arise in turbo machinery, such as steam turbines, as a result of localized heating caused by seals in rubbing contact with a rotary member of the turbo machine.

The configuration of the '086 patent is acceptable when multiple hard teeth are needed and when there is sufficient room for a large dovetail hard tooth carrier. For cases where fewer hard teeth are needed and there is little room, however, the large hard tooth carrier and brush seal carrier configuration of the '086 patent may not work. A smaller design would therefore be desirable.

BRIEF DESCRIPTION OF THE INVENTION

As noted above, current brush seal carriers take up significant room, driving up the amount of material needed to hold the carriers in place and restricting where the seals can be installed. As also noted above, some hard teeth are actually machined to the nozzle assembly so if the seal is worn, it cannot be replaced.

The invention proposes to reduce the amount of material necessary for forming a seal assembly while allowing all sealing devices to be replaced if necessary without any manufacturing or modification to the nozzle.

In an example embodiment of the invention, a brush seal carrier is provided that reduces the footprint of the brush seal assembly and its carrier while also integrating a hard tooth seal as a secondary/redundant/backup seal into the carrier. Integrating the hard tooth seal into the carrier provides for ease of replacement while the small footprint allows the brush seal to be installed in smaller areas. Integrating the hard tooth structure also allows the hard tooth to be provided with minimal support structure and yet allows the hard tooth to be replaced in the event it becomes worn.

Thus, the invention may be embodied in a brush seal carrier assembly comprising: a compliant brush seal component located between a backing plate and a forward plate, such that a radially inner portion of the compliant brush seal component projects radially beyond the backing plate; and at least one hard tooth seal element integrally formed with the forward plate so as to extend in generally parallel relation to the compliant brush seal component, wherein the hard tooth seal element extends radially beyond the backing plate but radially short of the compliant brush seal component; and wherein the at least one hard tooth seal element is axially spaced from the compliant brush seal element a distance at least three times a width dimension of the compliant brush seal component.

The invention may also be embodied in a seal assembly for a turbo machine having a rotor rotatable about an axis and a stationary nozzle assembly encircling the rotor, the rotor having a sealing surface and the stationary nozzle assembly having a radially facing portion opposed to the sealing surface, the seal assembly comprising: a seal carrier supported in the radially facing portion of the stationary nozzle assembly, the seal carrier comprising a backing plate, a hard tooth seal plate, and at a compliant seal component sandwiched between the backing plate and the hard tooth seal plate; the compliant seal component disposed in rubbing contact with the sealing surface; and at least one hard tooth seal element formed as one with said the hard tooth seal plate, the hard tooth seal element projecting radially toward but spaced from the sealing surface; wherein the hard tooth seal element is spaced axially from the compliant seal component by a distance equal to at least three times a width dimension of the compliant seal component.

The invention may further be embodied in a method of sealing a turbo machine rotary member relative to a stationary member encircling the rotary member, the rotary member having an outer circumferential sealing surface, the method comprising: (a) providing a first compliant seal component and a second hard seal element at a radially inward region of the stationary member, the first compliant seal component having a portion thereof in rubbing contact with the sealing surface of the rotary member, and the second hard seal element integrally formed in one piece with a carrier of the first compliant seal but radially spaced from sealing surface; and (b), locating the second hard seal element an axial distance upstream of the first compliant seal component of at least three times a width dimension of the first compliant seal component.

The invention, will be more completely understood and appreciated by careful study of the following more detailed description of the presently preferred exemplary embodiments of the invention taken in conjunction with the accompanying drawings identified below.

DETAILED DESCRIPTION OF THE INVENTION

Figure 1:
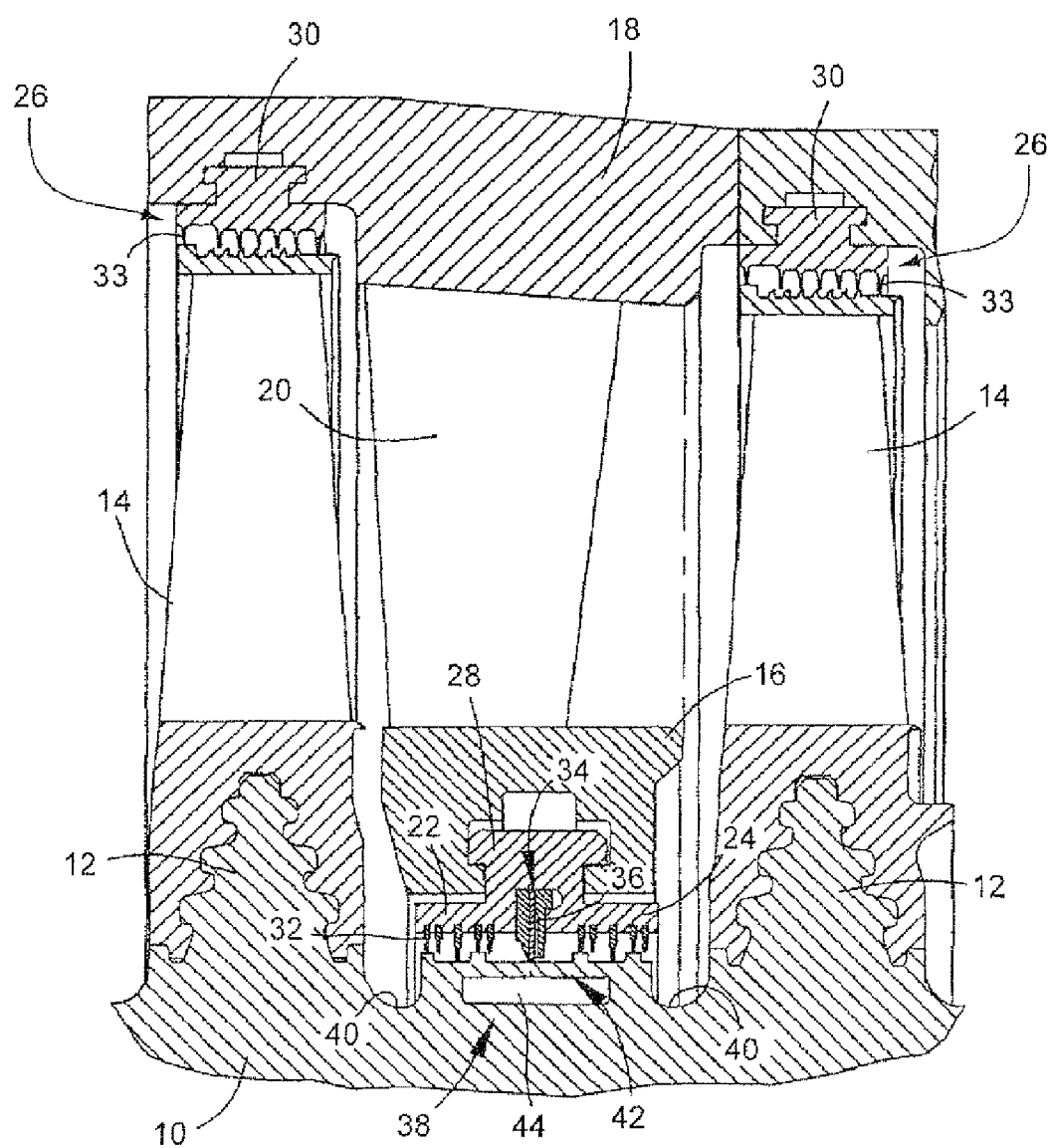
FIG. 1 represents a fragmentary longitudinal cross-sectional view of a diaphragm packing area of a steam turbine equipped with a sealing assembly of a related art.

Referring to FIG. 1, a diaphragm packing area of a steam turbine equipped with a sealing assembly in accordance with the '086 patent is illustrated. The steam turbine has a rotor 10 on which axially spaced wheels 12 are formed or mounted and to which buckets 14 are attached. The rotor 10, wheels 12, and buckets 14 rotate about the rotor axis and, therefore form part of a rotary portion of the turbine. A diaphragm (nozzle) inner ring (web) 16 extends radially inwardly between wheels 12, defining separate stages of the turbine. A casing 18 surrounds rotor 10 and with nozzle inner ring supports a nozzle partition 20. The ring 16, partition 20 and casing 18 together form part of a stationary portion of the turbine, disposed in a plane normal to the rotor axis and surrounding an outer circumferential region of the rotor 10. Steam flows in an axial direction, across the buckets 14 and nozzle partitions 20 as indicated by the flow arrow in FIG. 1.

The turbine depicted in FIG. 1 is equipped with Labyrinth packings 22, 24 and 26. Labyrinth packings 22 and 24 are mounted to a packing ring segment or a hard tooth carrier 28 and Labyrinth packing 26 is mounted to a packing ring segment 30. As is conventional, each packing ring segment 28, 30 is one of multiple arcuate segments that are assembled circumferentially to the nozzle inner ring 16 or casing 18, respectively. The Labyrinth packings 22, 24 and 26 reduce secondary flow losses between the rotary and stationary components, more particularly, between the rotor 10 and nozzle inner ring 16 and between the buckets 14 and casing 18. While effective, it is understood that the Labyrinth packings 22, 24 and 26 cannot reduce secondary flow losses to the extent possible with brush seals because of the gap between the hard teeth 32, 33 of the respective Labyrinth packings and the opposing surfaces with which they seal. Thus, in accordance with the '086 patent, the packing ring segment or hard tooth carrier 28 mounted to the nozzle inner ring 16 further includes a brush seal 34 situated axially between the sets of Labyrinth packings 22 and 24. The Labyrinth packings 22 and 24 thus serve as a backup seals to the brush seal 34. In contrast to packings 22 and 24, brush seal 34 is adapted to continuously contact the surface with which it is intended to seal, thereby effecting a better seal than possible with the Labyrinth packings 22 and 24. As is conventional, brush seal 34 is equipped with bristles 36 and, as mentioned above, Labyrinth packings 22 and 24 are equipped with hard teeth 32 that project radially towards rotor 10.

As understood, the rubbing contact that occurs between brush seal 34 and rotor 10 inherently causes frictional heating. In the '086 patent, better distribution and dissipation of the heat are achieved by including a raised section 38 on the rotor which projects radially outward beyond axially adjacent surface regions to define a platform 42. The raised section 38 defines a cavity 44 that is completely enclosed so that it contains, e.g., only air that was trapped during formation thereof.

Figure 2:
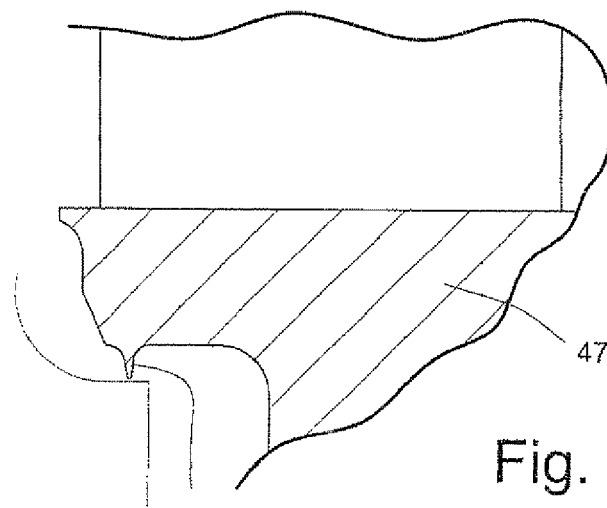
FIG. 2 is a schematic representation of another sealing assembly of a related art.

In another prior arrangement, as depicted in FIG. 2, a hard seal tooth 45 is machined to the nozzle structure 47 itself. However, if such a seal structure is worn through rubbing, the hard tooth seal structure cannot be replaced without also replacing the nozzle.

Figure 3:
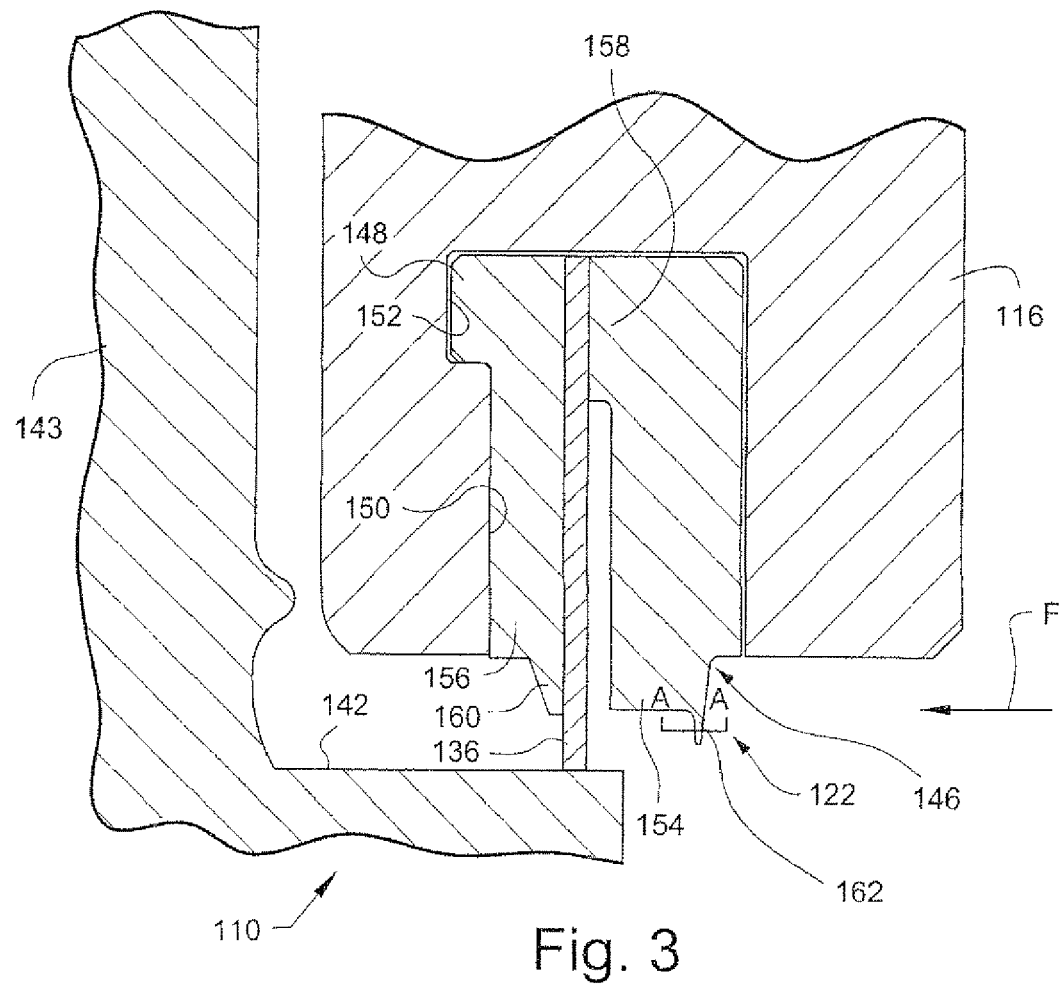
FIG. 3 is a schematic representation of a sealing assembly according to an example embodiment of the invention.

FIG. 3 represents a turbine similar to that illustrated in FIG. 1 but wherein the seal assembly has been modified and relocated according to an example embodiment of the invention so as to reduce the footprint of the brush seal carrier or carrier assembly 146 while also integrating a hard tooth seal 122 to serve as a backup seal to the brush seal. Referring more specifically to the example embodiment of the invention schematically depicted in FIG. 3, the brush seal carrier assembly 146 is comprised of compliant bristles 136 (also sometimes referred to herein as a compliant brush seal component or a "bristle pack") extending radially towards the rotary number or turbine rotor 110 and providing a tight seal with the facing (or sealing) surface of the rotor. The remaining parts of the turbine structure generally correspond to those as depicted by way of example in FIG. 1 and therefore are not illustrated again in FIG. 3, but it is to be understood that the disclosed exemplary embodiment enables certain related design changes. For example, the rotor in the example shown in FIG. 3 includes an annular landing 142 adjacent the root portion of the bucket 143 that serves as the sealing surface for a reduced-footprint seal as described in further detail below.

In the illustrated embodiment, rather than providing a dovetail for receipt in a dovetail groove, the carrier 146 has a single engaging hook or flange 148. The carrier 146 is illustrated as received in a shaped groove 150 formed directly in the diaphragm (or nozzle) inner ring or web 116 (and thus eliminating the need for carrier 28 shown in FIG. 1), with a single hook 148 received in channel portion 152 of the groove 150. In the illustrated example, moreover, the brush seal carrier 146 is a laminated structure comprised of the compliant bristles 136 sandwiched between the hard tooth seal 122 and a backing plate 156. The hard tooth seal 122 is comprised of a forward, integrated hard tooth seal plate 154 formed with a spacer portion 158 to space the compliant bristles 136 from the balance of the hard tooth seal plate 154 to thereby allow forward axial flexing of the compliant bristles 136 in a conventional manner. The backing plate 156, on the other hand, includes a projecting support 160 to limit aft axial flexing of the compliant bristles 136.

In an example embodiment of the invention, at least one hard tooth seal element 162 is incorporated (e.g., machined) into the hard tooth seal plate 154, at the radially inner end thereof, extending substantially parallel to the compliant bristles 136. The hard tooth seal element 162 does not extend radially inwardly to the same extent as the compliant bristles 136 and thus serves as a backup seal to the bristles.

It has been discovered that the compliant bristles 136 and hard seal 122 are most effective when the following spatial relationships are observed. The radial clearance between the tip of the integrated hard tooth seal element 162 and the rotor land 142 should be at least 2W, where W is the width of the bristle pack 136, as shown in FIG. 3; the hard tooth element 162 must be located upstream (relative to the flow direction arrow F) of the bristle pack 136 by a distance equal to at least 3W; and in the event an aft hard tooth seal element is employed downstream of the bristle pack, then the hard tooth seal element must be located downstream of the bristle pack 136 by at least 2.5W. In a typical arrangement, the width of the bristle pack 136 may be in the range of from about 0.05 to 0.07 inch. This arrangement allows both the brush seal and hard tooth seal to act independently, without interference from the other, while at the same time, enabling an overall reduction in the footprint of the brush seal carrier 146, as contrasted with the brush seal segment carrier 28 in FIG. 1.

In the example shown, the integrated hard tooth seal plate 154 is machined out of metal and includes at least one hard tooth seal element 162. The brush seal bristle pack 136 is laminated with and welded between the integrated hard tooth seal plate 154 and the backing plate 156 to thus form the carrier assembly. As will be understood, hard tooth integration not only facilitates a reduction in the dimension of the seal carrier, but also facilitates replacement of the hard tooth if it is damaged as the result of rubbing against the rotor.

As described above, the FIG. 1 configuration included a large brush seal carrier 34 that is installed into a hard tooth carrier 28 for multiple hard teeth. This adds to the material and space requirements for the assembly. It also dictates using more hard teeth 32 than may be necessary because of the sealing efficacy of the brush seal. The integrated configuration proposed hereinabove and schematically depicted in FIG. 3 allows the carrier 146 to be designed to have as few as one hard tooth 162. Furthermore, as will be appreciated, configuring the brush seal carrier 146 as a laminated assembly of plates and bristles that is mounted directly to, e.g., the nozzle web 116, further substantially reduces the axial dimension of the seal carrier 146 as compared to e.g. the seal carrier 28 depicted in FIG. 1.

It is to be understood that while the example carrier 146 includes the plates 154, 156 as described above, the carrier parts may have configurations and shape particulars that are different from the illustrated example. For example, although the backing plate 156 has been illustrated as including a hook 148 for engaging the channel 152 of the groove 150 in the nozzle web/diaphragm inner ring 116, the integrated hard tooth seal plate 154 may also include such a hook instead of, or in addition to, the hook 148 for engaging a respective channel in the diaphragm inner ring/nozzle web structure. Furthermore, while a hard tooth 162 has been illustrated as integrated in the plate 154, it is to be understood that in addition or in the alternative, either the plate 154 or the backing plate 156, or both, could have a hard tooth integrated therewith. Additionally, while only a single hard tooth has been illustrated, it is to be understood that the axial thickness of the respective plate could be adjusted to accommodate a varying number of hard teeth. Even further, while an example embodiment of the seal has been illustrated and described as going directly into the diaphragm (nozzle) inner ring (web), additionally, the new seal assembly could go directly into a groove in the stator above the bucket tip and create a seal there. This could be part of the casing or part of the diaphragm outer ring. Similar seal arrangements may be provided at other locations as needed.

Thus, while the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A brush seal carrier assembly adapted for insertion in a radially-oriented annular groove in a stationary turbine component comprising:
   a compliant brush seal component sandwiched between and engaged by an aft backing plate and a forward plate, said aft backing plate and said forward plate sized and shaped to fit into the radially-oriented annular groove; said compliant brush seal component, said aft backing plate and said forward plate being radially oriented and substantially parallel such that a radially inner portion of said compliant brush seal component projects radially beyond said aft backing plate; and
   at least one hard tooth seal element integrally formed with said forward plate so as to extend in generally parallel relation to said compliant brush seal component, wherein said hard tooth seal element extends radially beyond said aft backing plate but radially short of said compliant brush seal component; and
   wherein said at least one hard tooth seal element is axially spaced from said compliant brush seal component a distance at least three times a width dimension of said compliant brush seal component; and further wherein at least one of said forward plate and said backing plate is formed with a hook portion for engagement within a channel portion of the radially-oriented annular groove in the stationary turbine component.

2. The brush seal carrier assembly of claim 1 wherein said forward plate includes a spacer portion to space said compliant brush seal component from a remainder of said forward plate to allow forward axial flexing of said compliant brush seal component.

3. The brush seal carrier assembly of claim 1 wherein said width dimension is in a range of from 0.05-0.07 inch.

4. A seal assembly for a turbo machine having a rotor rotatable about an axis and a stationary nozzle assembly encircling the rotor, the rotor having a sealing surface and the stationary nozzle assembly having an annular radial groove in a radially facing portion opposed to the sealing surface, the seal assembly comprising:
   a brush seal carrier assembly comprising a backing plate, a hard tooth seal plate, and a compliant seal component seated in said annular radial groove, said compliant seal component sandwiched between and engaged by said backing plate and said hard tooth seal plate, said compliant seal component disposed in rubbing contact with said sealing surface; and at least one hard tooth seal element formed as one with said hard tooth seal plate, said hard tooth seal element projecting radially toward but spaced from said sealing surface; wherein said hard tooth seal element is spaced axially from said compliant seal component by a distance equal to at least three times a width dimension of said compliant seal component.

5. The seal assembly of claim 4 wherein said hard tooth seal plate includes a spacer portion to space said compliant seal component from a remainder of said hard tooth seal plate to allow forward axial flexing of said compliant seal component.

6. The seal assembly of claim 5 wherein said hard tooth seal element has a transverse cross-section at any point along its length that is substantially less than a cross-section of said remainder of said hard tooth seal plate at any point along its length.

7. The seal assembly of claim 4, wherein said compliant seal component comprises a compliant brush seal bristle pack.

8. The seal assembly of 4 wherein said hard tooth seal element extends substantially parallel to said compliant seal component.

9. The seal assembly of claim 4, wherein the turbo machine comprises a steam turbine.

10. The seal assembly of claim 4, wherein said seal carrier is separately formed from and detachably secured to said stationary nozzle assembly.

11. The seal assembly of claim 4 wherein a radial clearance dimension between said at least one hard tooth seal element and said sealing surface is at least twice the width dimension of said compliant seal component.

12. The seal assembly of claim 4, wherein said backing plate is engaged with said compliant seal component along substantially an entire length of said backing plate so as to limit aft flexing of said compliant seal component.

13. The seal assembly of claim 4 wherein at least one of said hard tooth seal plate and said backing plate defines a hook portion for engaging a corresponding channel in said stationary nozzle assembly.

14. The seal member of claim 4 wherein said width dimension of said seal component is in a range of from 0.05 to 0.07 inch.

15. A method of sealing a turbo machine rotary member relative to a stationary member encircling the rotary member, the rotary member having an outer circumferential sealing surface, comprising:

(a) providing a first compliant seal component and a second hard seal element at a radially inward region of the stationary member, said first compliant seal component having a portion thereof in rubbing contact with said sealing surface of said rotary member, and said second hard seal element integrally formed in one piece with a carrier of said first compliant seal component but radially spaced from said sealing surface; and (b) locating said second hard seal element an axial distance upstream of said first compliant seal component of at least three times a width dimension of said first compliant seal element;

wherein step (a) includes providing said first compliant seal component and said second hard sealing element in a carrier assembly, wherein said first compliant seal component is sandwiched between a backing plate and a hard tooth seal plate in which said hard seal element is unitarily formed, said backing plate and said hard tooth seal plate seated in a radially-oriented, annular groove formed in the stationary member, at least one of said hard tooth seal plate and said backing plate formed with a hook portion for engaging a corresponding channel formed in said radially-oriented annular groove.

16. The method of claim 15 wherein said width dimension of said compliant seal component is in a range of from 0.05 to 0.07 inch.

17. The method of claim 15 wherein a radial clearance dimension between said first hard tooth seal element and said sealing surface is at least twice the width dimension of said first compliant seal component.

* * * * *

UNITED STATES PATENT AND TRADEMARK OFFICE
CERTIFICATE OF CORRECTION

| | | |
|---|---|---|
| PATENT NO. | : 8,167,313 B2 | Page 1 of 1 |
| APPLICATION NO. | : 12/409824 | |
| DATED | : May 1, 2012 | |
| INVENTOR(S) | : Burdgick et al. | |

It is certified that error appears in the above-identified patent and that said Letters Patent is hereby corrected as shown below:

Column 3, line 35, delete "with nozzle inner ring" and insert --with nozzle inner ring 16--

Column 4, line 9, delete "surface regions" and insert --surface regions 40--

Signed and Sealed this
Tenth Day of July, 2012

David J. Kappos
*Director of the United States Patent and Trademark Office*